United States Patent
Aston et al.

(10) Patent No.: US 9,403,606 B2
(45) Date of Patent: *Aug. 2, 2016

(54) SPACECRAFT RADIATOR PANELS

(75) Inventors: Richard William Aston, Brea, CA (US); Michael J. Langmack, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/490,833

(22) Filed: Jun. 7, 2012

(65) Prior Publication Data

US 2013/0233516 A1 Sep. 12, 2013

Related U.S. Application Data

(63) Continuation-in-part of application No. 13/412,906, filed on Mar. 6, 2012.

(51) Int. Cl.
*B64G 1/50* (2006.01)
*F28D 15/02* (2006.01)

(52) U.S. Cl.
CPC .......... *B64G 1/503* (2013.01); *B64G 1/506* (2013.01); *F28D 15/02* (2013.01); *F28D 15/0275* (2013.01); *F28F 2240/00* (2013.01); *F28F 2275/08* (2013.01)

(58) Field of Classification Search
CPC ........ B64G 1/503; B64G 1/506; F28D 15/02; F28D 15/0275; F28D 1/0226; F28D 15/0233; F28D 2001/0286; F28D 2001/0293; F24D 3/141; F24D 3/144; F24J 2/32; Y02E 10/44
USPC .............. 165/41, 104.33, 135, 168; 244/133, 244/159.1, 171.7, 171.8; 248/74.2, 229.16, 248/229.26
See application file for complete search history.

(56) References Cited

U.S. PATENT DOCUMENTS 4,662,432 A * 5/1987 Suzuki ........................... 165/41
4,738,304 A * 4/1988 Chalmers et al. ............... 165/41
(Continued)

FOREIGN PATENT DOCUMENTS

| DE | 19530690 | 3/1998 |
|---|---|---|
| GB | 2270975 | 10/1994 |
| JP | H06207793 | 7/2001 |

OTHER PUBLICATIONS

U.S. Appl. No. 13/412,906, filed Mar. 6, 2012, Aston.
English language abstract of JP H06207793 obtained on Sep. 26, 2013 from espacenet.com.
(Continued)

*Primary Examiner* — M. Alexandra Elve
*Assistant Examiner* — Hans Weiland
(74) *Attorney, Agent, or Firm* — DASCENZO Intellectual Property Law, P.C.

(57) ABSTRACT

Spacecraft, radiator panels for spacecraft, kits for radiator panels, inserts associated with radiator panels, heat pipes associated with radiator panels, external structural reinforcement members associated with radiator panels, and methods of assembling radiator panels are disclosed herein. Some radiator panels include at least one insert that is positioned adjacent to a heat pipe between two spaced-apart face-sheets, with the insert being configured to secure a package to the inside face-sheet opposite of the heat pipe. Some radiator panels include at least one external structural reinforcement member that extends across an external side of the radiator panel.

13 Claims, 4 Drawing Sheets

(56) References Cited

U.S. PATENT DOCUMENTS

| | | | |
|---|---|---|---|
| 5,263,538 A | | 11/1993 | Amidieu et al. |
| 5,682,943 A | * | 11/1997 | Yao et al. .................. 165/104.33 |
| 5,806,803 A | | 9/1998 | Watts |
| 6,073,887 A | * | 6/2000 | Hosick .......................... 244/164 |
| 6,283,382 B1 | * | 9/2001 | Fitzemeyer ............. F24D 3/141 165/49 |
| 2003/0121639 A1 | | 7/2003 | Nomura |
| 2011/0277959 A1 | * | 11/2011 | Morin .................... B64G 1/503 165/104.11 |

OTHER PUBLICATIONS

English language abstract of DE 19530690 obtained on Sep. 26, 2013 from espacenet.com.
Webpage—www.alibaba.com/product-gs/465105003/longitudinal_fin_tube_type_U_, downloaded on Feb. 22, 2012.
Webpage—www.best-b2b.com/Products/545/589-2/heat-pipe-applied-heatsink_149454, downloaded on Feb. 22, 2012.
Webpage—forums.qrz.com/showthread.php?264955-TheBest-2-Meter-Beam, downloaded on Feb. 22, 2012.

* cited by examiner

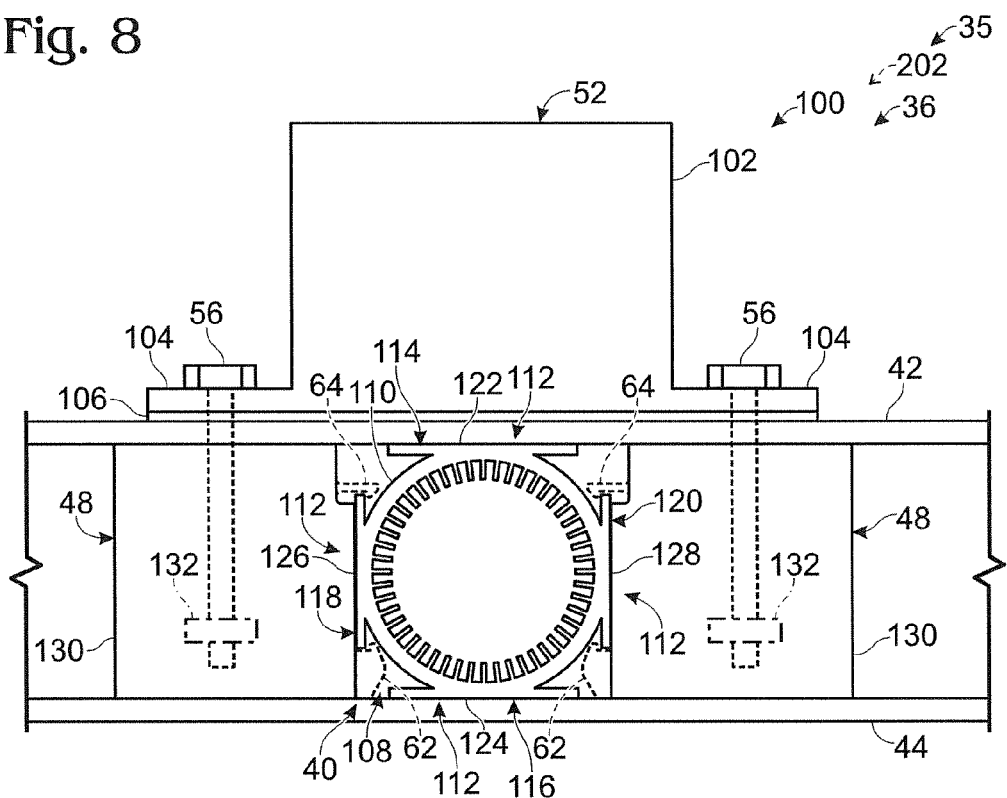
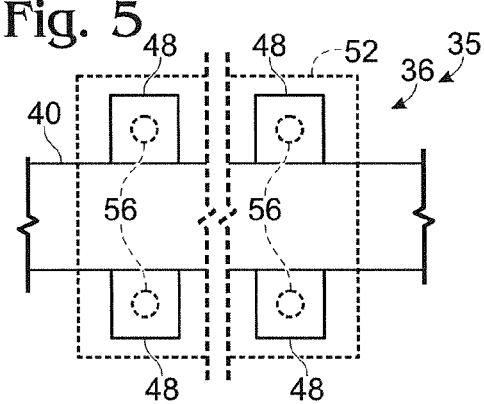
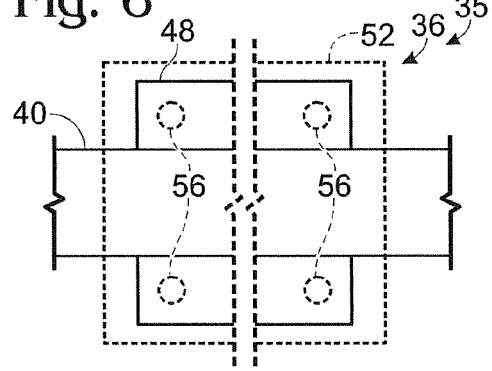
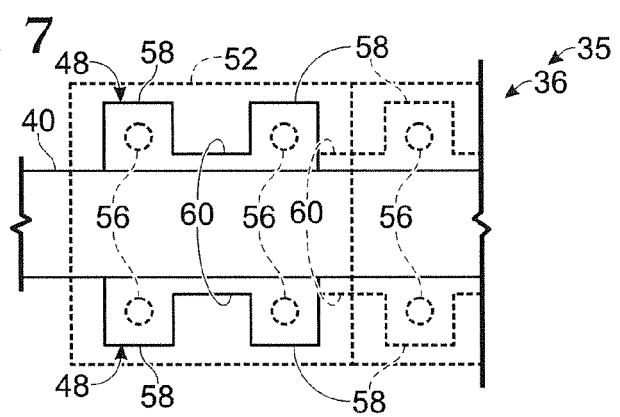

SPACECRAFT RADIATOR PANELS

RELATED APPLICATION

The present application is a continuation-in-part of, and claims priority to, U.S. patent application Ser. No. 13/412, 906, which was filed on Mar. 6, 2012, and the complete disclosure of which is hereby incorporated by reference.

FIELD

The present disclosure relates to spacecraft radiator panels.

BACKGROUND

Spacecraft include a plethora of equipment, such as electronic equipment, that generates heat. This heat must be dissipated, and because space is essentially void of air, the heat must be radiated to outer space. Spacecraft, such as satellites, typically include radiator panels that draw the heat from electronics and other equipment to an outer surface of the spacecraft.

With reference to the schematic diagram of FIG. 1, a typical prior art radiator panel 10 includes an inside face-sheet 12 that faces the inside of the spacecraft, an outside face-sheet 14 that faces the outside of the spacecraft toward outer space, a honeycomb core 16 positioned between the face-sheets to give the panel structural support, and one or more heat pipes 18 positioned between the face-sheets to translate the heat generated by an electronics package 20 away from the electronics package 20 to the outside face-sheet 14 and ultimately to outer space. Heat pipes are heat transfer devices that rely on phase transition of a working fluid to transfer heat from one location to another, such as from an electronic device to a heat sink, or in the application of a spacecraft, ultimately to outer space.

As seen in FIG. 1, the heat pipe 18 of the illustrated prior art radiator panel 10 includes a flange 22 extending from a body 24, with the flange 22 partially penetrating, or extending through, the inside face-sheet 12. The electronics package 20 is mounted to the flange 22 with a gasket 26 positioned between the electronics package 20 and the flange 22, and heat from the electronics package 20 conducts through the flange 22 to the body 24 of the heat pipe 18, for subsequent dissipation to outer space as discussed above. Because the flange 22 of the heat pipe 18 partially penetrates the inside face-sheet 12, the inside face-sheet 12 is required to be modified during assembly of the prior art radiator panel 10. That is, the inside face-sheet 12 is required to be machined, or otherwise modified, to include an opening 28 for the flange 22 to partially extend through. Moreover, because the body 24 of a flanged heat pipe 18 typically is extruded, the flange 22 initially extends the entire length of the heat pipe 18. Accordingly, during assembly of a typical prior art radiator panel 10, the flange 22 must be modified to only extend for a distance corresponding to a dimension of a package 20. Also, the honeycomb 16 is required to be modified to extend around the heat pipe 18, including the flange 22 of the heat pipe 18. This process during assembly of a radiator panel 10 may be referred to or described as core-stepping. During assembly of a prior art radiator panel 10, bolts 29 are utilized to secure the electronics package 20 to the heat pipe's flange 22.

As schematically illustrated in dashed lines in FIG. 1, prior art radiator panels 10 may include one or more stiffening members 19, such as in the form of an I-beam, on the internal surface of the inside face-sheet 12 to give the radiator panel 10 a desired stiffness. However, placement of stiffening members 19 presents several challenges with the design of prior art radiator panels 10 because of the various packages 20 and associated electronics, wiring harnesses, and other internal components of a spacecraft.

FIG. 2 schematically illustrates another typical prior art radiator panel 11. Prior art radiator panel 11 also includes an inside face-sheet 12, an outside face-sheet 14, a honeycomb core 16, and one or more heat pipes 18 for drawing heat away from an electronics package 20. The heat pipe 18 of prior art radiator panel 11, however, does not include a flange 22 that penetrates the inside face-sheet 12. Rather, prior art radiator panels 11 include epoxy-potted fasteners 13 that are positioned within bores 15 that are required to be machined through the inside face-sheet 12 and into the honeycomb core 16. Fasteners 13 receive bolts 29, and typically a layer of room-temperature vulcanizing (RTV) silicone sealer 17 is utilized between the electronics package 20 and the inside face-sheet 12. Fasteners 13 are not in mechanical communication with and do not engage the heat pipe 18. The joints formed by fasteners 13 and bolts 29 are subject to relaxation over time, and thus to mechanical creep, which results in an inefficient transfer of heat from the electronics package 20 to the heat pipe 18, and thus in an inefficient transfer of heat from the electronics package 20 to outer space.

Prior art radiator panels often include heat pipes that are over-sized, or that have the capability of transferring more heat than is required for the prior art radiator panel, because a desired stiffness of the radiator panel needs to be achieved. In other words, radiator panels of spacecraft are required to have an optimized stiffness in view of the conditions in which the spacecraft is launched, and the size of heat pipes are selected to achieve the optimized stiffness.

SUMMARY

Spacecraft, radiator panels for spacecraft, kits for radiator panels, inserts associated with radiator panels, heat pipes associated with radiator panels, external structural reinforcement members associated with radiator panels, and methods of assembling radiator panels are disclosed herein. Some radiator panels according to the present disclosure include two spaced-apart face-sheets, a core positioned between the face-sheets, and at least one external structural reinforcement member that extends across an external side of the outside face-sheet. In some embodiments, a plurality of external structural reinforcement members extends across the external side of the outside face-sheet. In some embodiments, the outer surface of the external structural reinforcement members reflects a substantial amount of incident light of the outer surface away from the outside face-sheet. Some embodiments of radiator panels according to the present disclosure have less mass and/or have less thickness than comparably stiff and sized radiator panels without external structural reinforcement members.

BRIEF DESCRIPTION OF THE DRAWINGS

FIG. 5 is a schematic plan view of a portion of a radiator panel including illustrative, non-exclusive examples of inserts according to the present disclosure.

FIG. 6 is another schematic plan view of a portion of a radiator panel including illustrative, non-exclusive examples of inserts according to the present disclosure.

FIG. 7 is another schematic plan view of a portion of a radiator panel including illustrative, non-exclusive examples of inserts according to the present disclosure.

FIG. 8 is a schematic profile view of an illustrative, non-exclusive example of a radiator panel according to the present disclosure, including illustrative, non-exclusive examples of inserts and a heat pipe according to the present disclosure.

DESCRIPTION

Spacecraft, radiator panels for spacecraft, kits for radiator panels, inserts associated with radiator panels, heat pipes associated with radiator panels, external structural reinforcement members, and methods of assembling radiator panels are disclosed herein.

Figure 3:
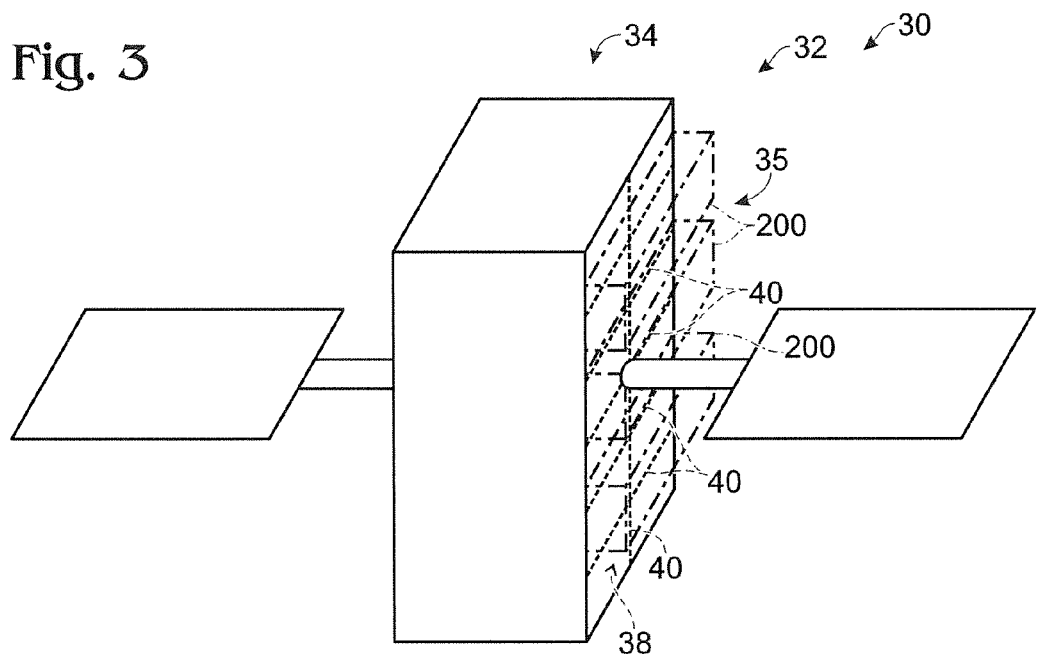
FIG. 3 is a schematic representation of an illustrative, non-exclusive example of a spacecraft according to the present disclosure in the form of a satellite.

FIG. 3 schematically represents illustrative, non-exclusive examples of spacecraft 30 in the form of satellites 32. However, other types of spacecraft 30 are within the scope of the present disclosure, and radiator panels, and associated components and kits, according to the present disclosure are not limited to being used with satellites 32. A satellite 32 includes a body 34 and at least one radiator panel 35, with the radiator panel 35 typically forming a wall, or other structural member, of the satellite's body 34. Spacecraft 30, including satellites 32 or other spacecraft, may include any number of radiator panels 35, including one, two, three, four, or more radiator panels 35. Radiator panels 35 additionally or alternatively may be described as radiators 35, radiator assemblies 35, and/or radiator panel assemblies 35. Some radiator panels 35 may be described as for use with high-powered units. For example, a radiator panel 35 may be configured to dissipate greater than 10 watts per square inch of radiator panel 35; however, values less than this value are within the scope of the present disclosure and may be associated with the heat dissipation of a radiator panel 35.

As schematically illustrated in FIG. 3 in dashed lines, radiator panels 35 typically include a network 38 of heat pipes 40 that are components of, positioned within, coupled to, or otherwise associated with a radiator panel 35. Networks 38 additionally or alternatively may be described as heat pipe networks 38. The schematic representation of six heat pipes 40 in FIG. 3 is illustrative only, and any number of heat pipes 40 may be associated with a radiator panel 35, including one or more heat pipes 40. In FIG. 3, five heat pipes 40 are illustrated as extending in a generally horizontal direction and a single heat pipe 40 is illustrated as extending in a generally vertical direction; however, any suitable orientation of heat pipes 40 may be used, and radiator panels 35 are not limited to including orthogonally oriented heat pipes 40 relative to the overall shape of the radiator panel 35. Moreover, while it is within the scope of the present disclosure that two heat pipes 40 associated with a radiator panel 35 are oriented transverse, and in some embodiments perpendicular, to each other, such a relationship is not required to all embodiments, and radiator panels 35 according to the present disclosure may or may not include transversely oriented heat pipes 40.

As also schematically illustrated in FIG. 3 in dashed lines, radiator panels 35 may include (but are not required to include) one or more external structural reinforcement members 200. These optional external structural reinforcement members 200 may take any suitable form and may be used to stiffen, or otherwise define a desired stiffness of, a radiator panel 35. An external structural reinforcement member 200, when provided, is positioned on the external side of the radiator panel 35, and therefore it is exposed to outer space and any light that is incident upon the radiator panel 35. In some embodiments, such as schematically illustrated in FIG. 3, the external structural reinforcement members 200 may span the entire width, or at least substantially the entire width, of the radiator panel 35; however, such a configuration is not required, and as schematically illustrated by the dash-dot lines in FIG. 3, an external structural reinforcement member 200 may extend for only a portion of the width of the radiator panel 35. Moreover, while the optional structural reinforcement members 200 of FIG. 3 are illustrated in generally orthogonally oriented and parallel positions relative to the overall shape of the radiator panel 35, such configurations are not required, and any suitable number, position, and configuration of optional external structural reinforcement members 200 may be used, for example, depending on the application of the radiator panel 35 or spacecraft 30, depending on a desired stiffness of the radiator panel 35, depending on a desired mass of the radiator panel 35, and/or depending on other properties and characteristics of radiator panels 35 and/or spacecraft 30.

Figure 4:
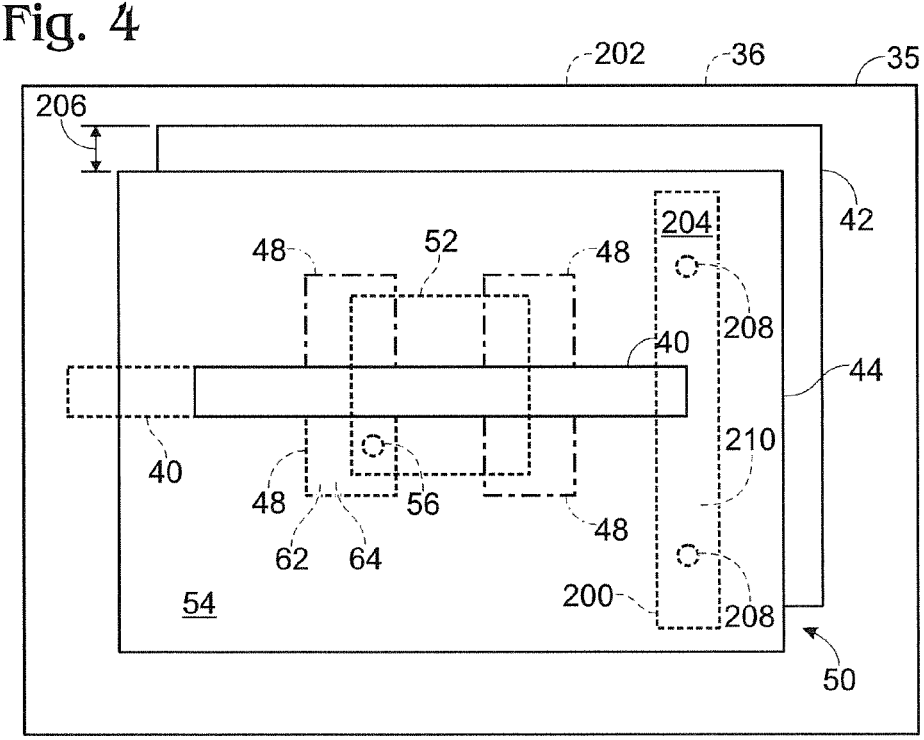
FIG. 4 is a schematic diagram representing radiator panels according to the present disclosure.

FIG. 4 schematically represents radiator panels 35, which may include radiator panels 36 and radiator panels 202 according to the present disclosure. As schematically illustrated, a radiator panel 35 typically includes an inside face-sheet 42, an outside face-sheet 44, at least one heat pipe 40, and a core 50. As schematically illustrated in dashed lines in FIG. 4, a radiator panel 35 additionally may include a package 52 that is secured to the inside surface of the inside face-sheet 42. As used herein, the relative terms 'inside' and 'outside' and similar relative terms, such as 'internal' and 'external,' refer to inside and outside of the spacecraft 30, with which the radiator panel 35 is associated. Accordingly, the inside face-sheet 42 of a radiator panel 35 is positioned on the inner side of the radiator panel 35 when the radiator panel 35 is installed on a spacecraft 30. Likewise, the outside face-sheet 44 of a radiator panel 35 is positioned on the outer side of the radiator panel 35 when it is installed on a spacecraft 30. Other relative terms used herein, such as 'left' and 'right' refer to the orientation of the drawing to which is being referred and do not limit the scope of structure being described.

The inside face-sheet 42 and the outside face-sheet 44, collectively may be referred to herein as two spaced-apart face-sheets. The face-sheets may be constructed of any suitable material, including (but not limited to) aluminum, aluminum alloy, titanium, titanium alloy, and steel, including stainless steel. In some embodiments, although not required, the outside face-sheet 44 may include a mirrored outer surface 54, such as to enhance the heat transfer properties of the radiator panel 35. In some embodiments, one or more of the two spaced-apart face-sheets may be constructed of the same material as a heat pipe 40. Additionally or alternatively, two or more of the face-sheets and the heat pipe(s) 40 may be constructed of materials that have a similar or identical thermal coefficient of expansion.

As discussed in more detail herein, some radiator panels 35 may not require penetration of the outside face-sheet 44 for appropriate mounting and securing of heat pipes 40 and associated packages 52. Accordingly, in embodiments that include a mirrored outer surface 54, the heat transfer properties of the mirrored outer surface 54 may not be compromised, such as with fasteners, brackets, and the like, in so far as a maximum surface area of the mirrored outer surface 54 may be retained.

Additionally or alternatively, in some embodiments, the inside face-sheet 42 may not be penetrated by a heat pipe 40 and/or an insert 48. Stated differently, in some embodiments, the heat pipe(s) 40 of a radiator panel 35, and/or a flange of or other structure associated with a heat pipe 40, may not extend through an opening in the inside face-sheet 42. Accordingly, methods of assembling radiator panels 35 may not require cutting the inside face-sheet 42 for passage of a portion of a heat pipe 40, such as a flange associated with a heat pipe 40. Additionally or alternatively, a method of assembling a radiator panel 35 may not include extending a portion of a heat pipe 40 through an opening in the inside face-sheet 42.

Heat pipes 40 may take any suitable form. In some embodiments, a heat pipe 40 may be an off-the-shelf heat pipe. Additionally or alternatively, a heat pipe 40 may not require customization, alteration, or modification for assembly and use in a radiator panel 35. Some embodiments of heat pipe 40 may be described as flangeless heat pipes. Moreover, as discussed, in some embodiments of radiator panels 35, the heat pipe(s) 40 may not penetrate, or otherwise extend through, the inside face-sheet 42 and/or the outside face-sheet 44. In some embodiments, the heat pipe(s) 40 may be positioned completely between the inside face-sheet 42 and the outside face-sheet 44. It also is within the scope of the present disclosure that a heat pipe 40 may be positioned between the inside face-sheet 42 and the outside face-sheet 44 without penetrating either of the two spaced-apart face-sheets, but that partially extends outside of the two spaced-apart face-sheets, such as schematically illustrated in dashed lines in FIG. 4. Such a configuration may be desired, for example, to position an end of a heat pipe 40 so that it is completely exposed to outer space when a spacecraft 30 is in operation.

In some embodiments of radiator panels 35, the heat pipe(s) 40 are operatively engaged with and in thermal communication with one or both of the inside face-sheet 42 and the outside face-sheet 44. By 'operatively engaged with,' it is meant that the heat pipe 40 may be in direct physical, or mechanical, contact with one or both of the two spaced-apart face-sheets, and that the heat pipe 40 may be in indirect physical, or mechanical, communication with one or both of the two spaced-apart face-sheets, such as with a gasket or sealant positioned directly between the heat pipe 40 and a face-sheet. Accordingly, as discussed, the heat from a package 52 may conduct from the package 52, through the inside face-sheet 42 to a heat pipe 40 for transfer of the heat away from the package 52 and ultimately to outer space during operation of the spacecraft 30.

Some heat pipes 40 according to the present disclosure may include a body that is extruded, for example, from aluminum, aluminum alloy, titanium, titanium alloy, or steel, including stainless steel. Other conductive materials also are within the scope of the present disclosure and may be used, and methods other than extrusion may be used, to construct a heat pipe body.

The core 50 of a radiator panel 35 may take any suitable form to provide the radiator panel 35 with structural integrity. For example, the core 50 may include honeycomb or other corrugated structures that define the spacing between the inside face-sheet 42 and the outside face-sheet 44, and that enable the overall radiator panel 35 to be low in mass, while at the same time provide for an appropriate structural integrity and internal volume for one or more heat pipes 40. In some embodiments of radiator panels 35, the core may not need to be altered to appropriately position one or more heat pipes 40 in a desired position between the inside face-sheet 42 and the outside face-sheet 44.

Radiator panels 35 may include, or may be configured to be coupled to, any number of and any configuration of packages 52. As used herein, a package 52 is any structure that is mounted to, or is provided for mounting to, or is desired to be mounted to, the side of the inside face-sheet 42 that faces the inside of the spacecraft 30, and which typically produces (or transfers) heat that is desired to be transferred by a heat pipe 40 for radiation to outer space during operation of a spacecraft 30. Illustrative, non-exclusive examples of packages 52 include (but are not limited to) electronics equipment, mechanical equipment (e.g., motors, etc.), energy generation equipment (e.g., batteries, fuel cells, etc.), as well as heat pipes 40 of a heat pipe network 38. While only one package 52 and one heat pipe 40 are schematically illustrated in FIG. 4, any number of packages 52 and heat pipes 40 may be included or used with a radiator panel 35.

In FIG. 4, package 52 is illustrated as overlapping heat pipe 40, schematically representing a conductive relationship between the package 52, the heat pipe 40, and the inside face-sheet 42. In other words, as discussed herein, a package 52 is mounted to the inside face-sheet 42 so that heat will conduct from the package 52, through the inside face-sheet 42, to the heat pipe 40, so that the heat pipe 40 can transfer the heat away from the package 52 and ultimately to outer space during operation of a spacecraft 30. In some embodiments, a package 52 is secured to the inside face-sheet 42 opposite, and in some embodiments directly opposite, a heat pipe 40.

In some embodiments, a package 52 may be adhered, or sealed, to the inside face-sheet 42. Additionally or alternatively, a gasket may be operatively positioned between and engaged with a package 52 and the inside face-sheet 42. Accordingly, a package 52 may be described as being operatively engaged with, including operative thermal and mechanical engagement with, the inside face-sheet 42. Illustrative, non-exclusive example of suitable sealers include (but are not limited to) room-temperature vulcanizing (RTV) silicone sealers. Illustrative, non-exclusive examples of gaskets include (but are not limited to) form-in-place gaskets and compression gaskets, including pre-cured RTV gaskets and graphite gaskets. In some embodiments, a pre-load may be placed on the gasket, which may facilitate secure and operative contact between a package 52 and the inside face-sheet 42 over the lifetime of a spacecraft 30, including for up to 10 years, up to 15 years, or for greater than 15 years.

As discussed, a package 52 may include a heat pipe 40 of a heat pipe network 38 associated with a radiator panel 35. As an illustrative, non-exclusive example with reference back to FIG. 3, the schematically represented vertical heat pipe 40 may be a package 52, with the vertical heat pipe 40 being mounted to the side of the inside face-sheet 42 that faces toward the inside of the spacecraft 30 (that is, the internal side of the inside face-sheet 42), rather than being positioned between the inside face-sheet 42 and the outside face-sheet 44. In such a configuration, other packages 52, such as electronics equipment or other heat producing equipment, may conduct heat through the inside face-sheet 42 to the horizontally oriented heat pipes 40, which in turn transfer the heat back through the inside face-sheet 42 to the vertically oriented heat pipe 40, and ultimately to a region of the radiator panel 35 that radiates the heat to outer space during operation of the spacecraft 30. Other configurations also are within the scope of the present disclosure, and the relative orientation of the heat pipes 40 in the described example is not limiting.

In FIG. 4, package 52 is schematically illustrated in dashed lines, schematically representing that the package may be considered a component of a radiator panel 35 or it may be considered a separate component that is coupled to a radiator panel 35.

As schematically illustrated in FIG. 4 in dashed lines, some radiator panels 35 may include an insert 48, with such radiator panels 35 being referred to here as radiator panels 36. In other words, radiator panels 36 are examples of radiator panels 35, but radiator panels 35 are not required to include an insert 48. Inserts 48, when present, may take any suitable form and may be constructed of any suitable material. As illustrative, non-exclusive examples, an insert 48 may be constructed of a conductive material such as of aluminum, aluminum alloy, titanium, titanium alloy, or steel, including stainless steel. Non-conductive materials also may be used to construct an insert 48, depending on the desired properties of the insert 48. In some embodiments, the insert 48 may have a similar or identical thermal coefficient of expansion as one or more of the heat pipe(s) 40, the inside face-sheet 42, and/or the outside face-sheet 44. Inserts 48 may be constructed utilizing a machining process, but other methods of producing inserts 48 also are within the scope of the present disclosure.

Inserts 48 are configured to be positioned between the inside face-sheet 42 and the outside face-sheet 44 of a radiator panel 36, adjacent to a heat pipe 40, to operatively secure a package 52 to the inside face-sheet 42. Accordingly, in FIG. 4, insert 48 is illustrated in an overlapping relation with package 52, schematically representing that at least a portion of an insert 48 may be positioned directly opposite at least a portion of a package 52, relative to the inside face-sheet 42.

As an illustrative, non-exclusive example, inserts 48 may be configured to operatively receive a fastener 56 for securing a package 52 to the inside face-sheet 42. For example, the insert 48 may include a tapped bore for mating with a threaded fastener. Additionally or alternatively, the insert 48 may include a bore or other passage for receiving a fastener 56 and may be configured so that a nut or other structure may mate with the fastener 56. Accordingly, assembly of a radiator panel 36 may require drilling, or otherwise machining, one or more holes through the inside face-sheet 42 for passage of one or more fasteners 56.

In FIG. 4, a single fastener 56 is schematically illustrated as being associated with an insert 48; however, any suitable number of fasteners 56 and corresponding holes in the inside face-sheet 42 may be utilized, depending on the embodiment of radiator panel 36 and/or on the embodiment of insert 48 being used and/or depending on the configuration of package 52 being secured to the inside face-sheet 42.

In FIG. 4, a single insert 48 is illustrated in dashed lines, and three additional inserts 48 are illustrated in dash-dot lines, schematically representing that any suitable number of inserts 48 may be used to operatively secure a package 52 to an inside face-sheet 42 of a radiator panel 36. In some embodiments of a radiator panel 36, it may be desirable to install inserts 48 in pairs, such as in positions directly opposite each other relative to a heat pipe 40, as schematically illustrated in FIG. 4. It also is within the scope of the present disclosure, such as depending on the size of package 52 being secured to the inside face-sheet 42, that more than one insert 48 may be installed in a spaced-apart relation to each other along the length of a heat pipe 40, as optionally and schematically illustrated in FIG. 4.

In some embodiments, insert(s) 48 may not extend through an opening in the inside face-sheet 42. Accordingly, methods of assembling radiator panels 36 may not require cutting the inside face-sheet 42 for passage of a portion of an insert 48. Additionally or alternatively, a method of assembling a radiator panel 36 may not include extending a portion of an insert 48 through an opening in the inside face-sheet 42.

In some embodiments, the core 50 may not need to be modified for securing a package 52 to an insert 48 and the inside face-sheet 42. Additionally or alternatively, some methods of assembling a radiator panel 36 may not require core-stepping.

FIGS. 5-7 schematically represent illustrative, non-exclusive examples of various insert configurations that are within the scope of the present disclosure. For example, in FIG. 5, a plurality of similarly or identically configured inserts 48 are positioned in a spaced-apart relation to each other along opposite sides of a heat pipe 40, with the extent of the inserts 48 generally corresponding to the footprint of a package 52. In the example of FIG. 5, each insert 48 is associated with a single fastener 56, but other configurations are within the scope of the present disclosure. In FIG. 6, rather than including more than one insert 48 on each side of heat pipe 40, a pair of elongate inserts 48 are utilized with the extent of the two inserts 48 generally corresponding to the footprint of a package 52. Moreover, in the example of FIG. 6, each insert 48 is associated with more than one fastener 56, but other configurations also are within the scope of the present disclosure. In the example of FIG. 7, elongate inserts 48 are depicted, but with each insert 48 including a plurality of bodies 58 separated by a web 60, and with each body 58 being associated with at least one fastener 56. Other configurations of inserts 48 are within the scope of present disclosure, and the examples of FIGS. 5-7 are not limiting. Moreover, a radiator panel 36 may include one or more of variously configured inserts 48, and not all inserts 48 for a radiator panel 36 are required to have the same configuration.

Some embodiments of inserts 48 may be specifically configured to mate with, or otherwise be associated with, a specific configuration of a heat pipe 40. For example, as discussed herein and with reference back to FIG. 4, an insert 48 may include (but is not required to include) one or more of a positioning structure 62 and/or a retaining structure 64 configured to position and/or retain the insert 48 relative to a heat pipe 40. In some embodiments, an insert 48 may be operatively engaged and in thermal communication with one or more of the inside face-sheet 42, the outside face-sheet 44, and/or the heat pipe 40. By 'operatively engaged with,' it is meant that an insert 48 may be in direct physical, or mechanical, contact with a heat pipe 40, and that an insert 48 may be in indirect physical, or mechanical, communication with a heat pipe 40, such as with a gasket or sealant positioned directly between the insert 48 and the heat pipe 40. This operative engagement between an insert 48 and a heat pipe 40 is advantageous, because such a configuration resists joint relaxation and mechanical creep, thereby leading to an efficient and long-term transfer of heat from a package 52 to a heat pipe 40 and ultimately to outer space.

Additionally or alternatively, inserts 48 may be adhered, or sealed, to an adjacent heat pipe 40. Additionally or alternatively, a gasket may be operatively positioned between and engaged with an insert 48 and a heat pipe 40. Additionally or alternatively, one or both of an adhesive, or sealer, and/or a gasket may be used between an insert 48 and one or both of the inside face-sheet 42 and/or the outside face-sheet 44 of radiator panel 36. Illustrative, non-exclusive examples of suitable sealers include (but are not limited to) room-temperature vulcanizing (RTV) silicone sealers and epoxy. Illustrative, non-exclusive examples of gaskets include (but are not limited to) form-in-place gaskets and compression gaskets, including pre-cured RTV gaskets and graphite gaskets.

Kits for assembling radiator panels 36 are within the scope of the present disclosure and may include a selection of the various components necessary to assemble a radiator panel 36. For example, a kit may include one or more of each of an inside face-sheet 42, an outside face-sheet 44, a heat pipe 40, and an insert 48. In some kits, a plurality of inserts 48 may be provided. In some examples, inserts 48 of various dimensions, configurations, and/or sizes may be included within a kit, such as corresponding to (but not limited to) the examples of the schematic representations of FIGS. 5-7. Accordingly, suitable inserts 48 may be selected, such as based at least in part on correspondence to a particular configuration of package 52 being mounted to an inside face-sheet 42. For example, although not required, one or more inserts 48 having a dimension corresponding to a dimension of a first package 52 may be selected to mount the first package 52 to an inside face-sheet 42, and one or more inserts 48 having a dimension corresponding to a dimension of a second package 52 may be selected to mount the second package 52 to the inside face-sheet 42. Additionally or alternatively, a plurality of inserts 48 may be selected to be spaced-apart along the dimension of a corresponding package 52. Other configurations also are within the scope of the present disclosure, and a kit may include any number of variously configured inserts 48 for use in assembling a radiator panel 36.

When a radiator panel 36 is assembled, the radiator panel may be less susceptible to mechanical creep than radiator panels according to the prior art. As discussed, no penetration of the inside face-sheet 42 with a heat pipe 40, or associated flange of a heat pipe 40, is required to assemble a radiator panel 36. Moreover, in some embodiments, the inside face-sheet 42, the insert 48, and the body of the heat pipe 40 may be constructed of materials having similar or identical thermal coefficients of expansion. Moreover, a package 52 is secured to the inside face-sheet 42 by one or more inserts 48. Moreover, the compression of optional gaskets between a package 52 and the inside face-sheet 42 may not be lost over the lifetime of a spacecraft 30 and associated radiator panel 36. Moreover, the operative engagement between the insert(s) 48 and the heat pipe 40, the operative engagement between the package 52 and the inside face-sheet 42, and the fastening of the package 52 to the insert(s) 48 reduces the joint relaxation and mechanical creep that occurs with prior art radiator panels. These and other characteristics of radiator panels 36 may restrict, or resist, mechanical creep and may provide for a more efficient transfer of heat from a package 52 to a heat pipe 40 and ultimately to outer space than is possible with prior art radiator panels.

Additionally or alternatively, because a heat pipe 40 is not required to be modified, or otherwise customized, the design process for a radiator panel 36 for a spacecraft 30 is more efficient than otherwise possible with prior art radiator panels. For example, the design process for a radiator panel typically requires iterative steps, and sometimes several iterative steps, to appropriately position several packages 52 on an inside face-sheet 42. Because heat pipes 40 do not have to be modified and because the heat pipes 40 do not penetrate the inside face-sheet 42, the modification of heat pipes 40 and subsequent changes to the design do not require the scrapping of modified heat pipes and face-sheets that no longer correspond to the changed design. Other advantages and efficiencies also are experienced with the design and assembly of radiator panels 36 according to the present disclosure.

Turning now to FIG. 8, an illustrative, non-exclusive example of a radiator panel 36, which optionally also may be a radiator panel 202, is schematically illustrated in profile and is indicated generally at 100. Where appropriate, the reference numerals from the schematic illustrations of FIGS. 3-7 are used to designate corresponding parts of radiator panel 100; however, the example of FIG. 8 is non-exclusive and does not limit the present disclosure to the illustrated embodiment. That is, neither radiator panels 36, nor portions thereof, are limited to the specific embodiment of radiator panel 100 illustrated in FIG. 8, and radiator panels 36 may incorporate any number of the various aspects, configurations, characteristics, properties, etc. of radiator panels 36 or components thereof, including the schematically illustrated examples of FIGS. 3-7, and/or of radiator panel 100, as well as variations thereof, without requiring the inclusion of all such aspects, configurations, characteristics, properties, etc. For the purpose of brevity, each previously discussed component, part, property, etc. or variants thereof may not be discussed again with respect to radiator panel 100 of FIG. 8; however, it is within the scope of the present disclosure that the previously discussed features, variants, etc. may be utilized with radiator panel 100.

Radiator panel 100 is illustrated together with, and may be described as including, a package 52. The illustrated package 52 includes a body 102 and a pair of flanges 104 for receiving corresponding fasteners 56 for securing the package 52 to the inside face-sheet 42. In the illustrated example, a gasket 106 is positioned between the package 52 and the inside face-sheet 42; however, as discussed herein, a sealer may additionally or alternatively be used, but neither a gasket 106 nor a sealer is required to all embodiments of radiator panels 36.

The illustrative non-exclusive example of a heat pipe 40 utilized in radiator panel 100 is generally indicated at 108 and may be described as an off-the-shelf, unaltered heat pipe 40. Heat pipe 108 includes a cylindrical core 110 and four generally planar extensions 112 extending from the cylindrical core 110. Although not required, the cylindrical core 110 and the extensions 112 may be extruded as a single monolithic body. Extensions 112 include an inside extension 114, an outside extension 116, a left extension 118, and a right extension 120. The left and right extensions additionally or alternatively may be referred to as side extensions.

The inside extension 114 defines an inside planar surface 122 that faces away from the cylindrical core 110 and that operatively engages and is in thermal communication with the inside face-sheet 42. The outside extension 116 defines an outside planar surface 124 that faces away from the cylindrical core 110, that is parallel to the inside planar surface 122, and that operatively engages and is in thermal communication with the outside face-sheet 44. The left extension 118 defines a left planar surface 126 that faces away from the cylindrical core 110 and that engages and is in thermal communication with the left insert 48. The right extension 120 defines a right planar surface 128 that faces away from the cylindrical core, that is parallel to the left planar surface 126, and that operatively engages and is in thermal communication with the right insert 48.

In dashed lines in FIG. 8, the inserts 48 are both illustrated as including optional positioning structure 62 and optional retaining structure 64 extending from the body 130 of the inserts 48. The optional positioning structures 62 of the inserts 48 of radiator panel 100 include structure that is configured to engage and appropriately position the body 130 of the inserts 48 relative to the respective planar surfaces of the side extensions of the heat pipe 108. More specifically, the optional positioning structures 62 of radiator panel 100 are in the form of a projection having a lip that wraps around the lower edge of the respective side extension of the heat pipe 108. The optional retaining structures 64 of the inserts 48 of radiator panel 100 include structure that is configured to operatively retain the body 130 of the inserts 48 into operative engagement with the respective planar surfaces of the side extensions. The optional retaining structures 64 illustrated in the example of FIG. 8 may be described as clips 64, or as spring clips 64. As discussed herein, an insert 48 may include neither of or one or both of the optional positioning structure 62 and the optional retaining structure 64.

Inserts 48 of radiator panel 100 are configured to receive fasteners 56. As discussed herein, it is within the scope of the present disclosure that inserts 48 may include tapped bores for appropriate mating with fasteners 56. Additionally or alternatively, as illustrated in dashed-dot lines in FIG. 8, inserts 48 may be configured to accommodate a nut 132 for appropriate mating with fasteners 56. As discussed, other configurations of inserts 48 and fasteners 56 are within the scope of the present disclosure.

Referring back to FIG. 4, and as mentioned, FIG. 4 also schematically represents radiator panels 202 according to the present disclosure. Radiator panels 202 are examples of radiator panels 35 that include one or more optional external structural reinforcement members 200. In other words, radiator panels 202 are examples of radiator panels 35, but radiator panels 35 are not required to include an external structural reinforcement member 200. Moreover, radiator panels 202 also may (but are not required to) be radiator panels 36 according to the present disclosure, such as including optional inserts 48 associated with radiator panels 36. That is radiator panels 36 and radiator panels 202 are not necessarily, but may be, mutually exclusive.

When present, an external structural reinforcement member 200 may take any suitable form and may be constructed of any suitable material. Illustrative, non-exclusive examples of suitable materials include (but are not limited to) aluminum alloys, aluminum-beryllium alloy, aluminum 6061-T6, and other metallic and non-metallic materials having desired properties.

External structural reinforcement members 200 define an outer surface 204 that generally faces away from the outside face-sheet 44. In some embodiments, the outer surface 204 is shaped to restrict reflection of light that is incident on the outer surface 204 onto the outside face-sheet 44. In other words, an external structural reinforcement member 200, and more specifically its outer surface 204, may be configured to reflect incident light away from portions of the outside face-sheet 44 that are not obstructed by the external structural reinforcement member(s) 200. In some embodiments, the external structural reinforcement members 200 may be described as being configured so as to not create any, or at least to minimize the creation of, light traps that may result in unwanted radiation of solar energy to the radiator panel 202. Such configurations may be beneficial, so that the efficiency, or productiveness, of the radiator panel 202 is not compromised, and in some embodiments is perhaps even improved over radiator panels without external structural reinforcement members 200.

In embodiments that include a plurality of external structural reinforcement members 200, the spacing between adjacent external structural reinforcement members 200 may facilitate the restriction of reflection of light incident on the outer surface 204 of the external structural reinforcement members 200 onto the outside face-sheet 44. That is, the spacing of the optional external structural reinforcement members 200 may be selected so that no light traps are created that otherwise may result in the heating of the radiator panel 202, as opposed to the radiator panel 202 radiating heat away from the radiator panel 202.

In some embodiments, one or both of the position of the outer surface(s) 204 and/or the spacing of a plurality of external structural reinforcement members 200 may reflect at least 30%, at least 40%, at least 50%, at least 60%, at least 70%, at least 80%, at least 90%, 30%-90%, 30%-70%, 30%-50%, 50%-90%, 50%-70%, or 70%-90% of all incident light on the outer surface(s) 204 away from the outside face-sheet 44.

To achieve the desired reflection of light away from the outside face-sheet 44, the outer surface 204 of one or more external structural reinforcement members 200 may include one or more planar surfaces and/or one or more curved, or arcuate, surfaces. Any suitable configuration of outer surfaces 204 may be used to achieve a desired or optimized configuration with respect to the reflection of light away from the outside face-sheet 44.

In some embodiments, the outer surface 204 of an external structural reinforcement member 200 may have a mirrored finish 210. In some embodiments, the mirrored finish 210 may be defined by one or more discrete mirror structures that are operatively coupled to a body of the external structural reinforcement member 200. As illustrative, non-exclusive examples, mirror structures may include quartz mirrors having a thickness of approximately 2 mils (0.05 mm) adhered to the body of the external structural reinforcement member 200 with an RTV silicone sealer. Other configurations also are within the scope of the present disclosure, including mirrors constructed of different materials, mirrors having a thickness greater than or less than the thickness disclosed herein, as well as external structural reinforcement members 200 having bodies with a mirrored outer surface 54 without the inclusion of a separate mirror structure. Additionally or alternatively, the outer surface 204 of an external structural reinforcement member 200 may have a thermal coating, such as a high emissivity paint.

The number of, the configuration of, and/or the positioning of optional external structural reinforcement members 200 of radiator panels 202 may be selected to define a desired or predetermined natural frequency for the radiator panel 202. As illustrative, non-exclusive examples, a radiator panel 202 may be designed to have, and may have, a natural frequency of approximately 20-50, 30-50, 40-50, 20-40, 30-40, 20-30, 20, 25, 30, 35, 40, 45, or 50 hertz.

Additionally or alternatively, the number of, the configuration of, and/or the positioning of optional external structural reinforcement members 200 of radiator panels 202 may be selected to define a stiffness of the radiator panel 202 corresponding to a desired, or predetermined, thickness, or depth, 206 of the radiator panel 202, with the thickness 206 being defined as the distance from the external surface of the outside face-sheet 44 to the internal surface of the inside face-sheet 42, as schematically indicated in FIG. 4. In such embodiments, the thickness 206 may correspond to the size of a heat pipe 40 positioned between the face-sheets 42, 44. Moreover, the thickness 206 may be less than the thickness of a comparably stiff and sized radiator panel that does not include one or more external structural reinforcement members 200. As an illustrative, non-exclusive example, a radiator panel 202 according to the present disclosure may have a natural frequency of approximately 35 hertz and may have panel thickness that is less than the thickness of a radiator panel that does not include any external structural reinforcement members 200 but that has a natural frequency of approximately 35 hertz. The thickness 206 of a radiator panel 202 may be less than 90%, 80%, 70%, 60%, 50%, 40%, or 30% of the thickness of a comparably stiff and sized radiator panel that does not include any external structural reinforcement members 200. By comparably sized, it is meant that a comparable radiator panel has approximately the same width and height, but not necessarily the same thickness, and includes similar configurations of packages 52 and associated structures of the radiator panel 202 to which it is being compared.

Additionally or alternatively, the thickness 206 of a radiator panel 202 may be selected based on the size of one or more heat pipes 40 required to result in a desired, or predetermined, heat transfer rate of the radiator panel 202. Stated differently, one or more heat pipes 40 may be sized to have a predetermined heat transfer rate that is not significantly greater that a requisite heat transfer rate for the radiator panel 202, such as based in part on the heat produced by packages 52 and requiring radiation away from a spacecraft 30. As illustrative, non-exclusive examples, a size of heat pipe(s) 40 may be selected so that the heat transfer rate associated with the heat pipe(s) 40 is no more than 100%, 110%, 120%, 130%, 140%, 150%, 160%, 170%, 180%, 190%, or 200% of the requisite heat transfer rate for the radiator panel 202. Accordingly, a radiator panel 202 may include heat pipes 40 that are smaller than heat pipes 40 associated with a comparably stiff and sized radiator panel that does not include any external structural reinforcement members 200. Stated differently, the size of heat pipes 40 to be used with a radiator panel 202 may be selected based on their heat transfer properties alone and without consideration of the stiffness of the heat pipes 40 as associated with the ultimate stiffness of the radiator panel 202. In other words, radiator panels 202 do not require over-sized heat pipes 40 in order to produce a radiator panel with a desired, or predetermined, stiffness. In contrast, prior art radiator panels do require over-sizing heat pipes in order to produce a radiator panel with a desired, or predetermined, stiffness.

Additionally or alternatively, a radiator panel 202 may have a mass that is less than the mass of a comparably stiff radiator panel that does not include any external structural reinforcement members 200. As illustrative, non-exclusive examples, a radiator panel 202 may have a mass that is at least 5%, 10%, 15%, 20%, 25%, or 30% less than the mass of a comparably stiff and sized radiator panel.

Figure 1:
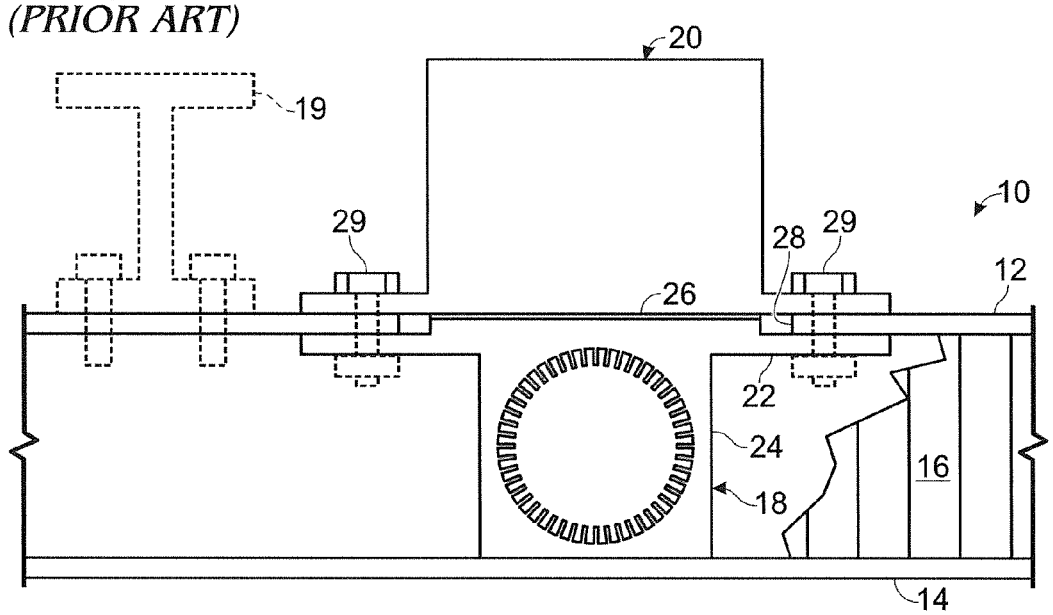
FIG. 1 is a schematic profile view of a prior art radiator panel for a spacecraft.
Figure 2:
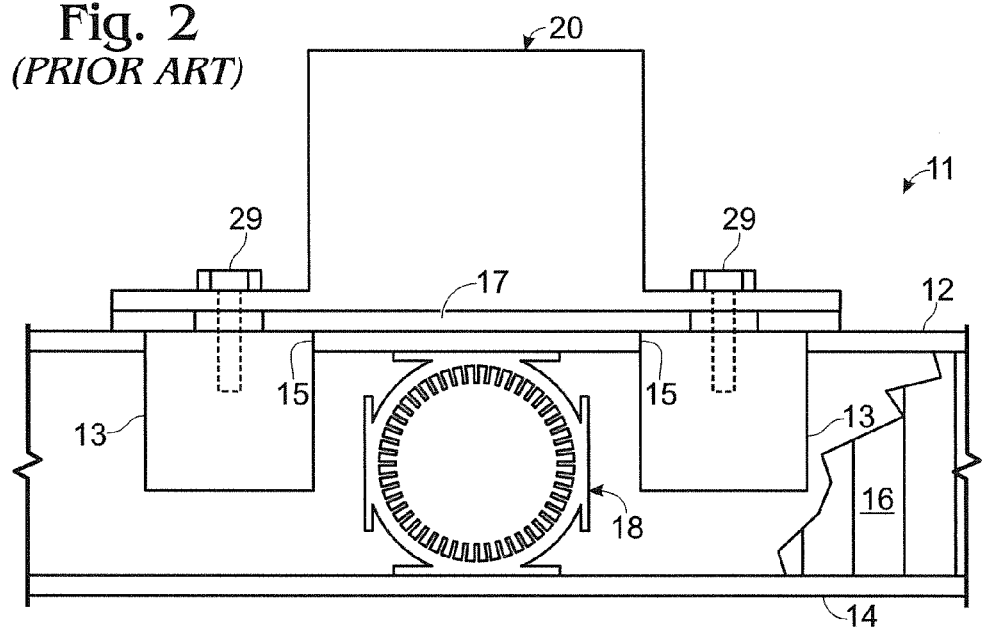
FIG. 2 is a schematic profile view of another prior art radiator panel for a spacecraft.

Additionally or alternatively, a radiator panel 202 may be free of internal structural reinforcement members that are coupled to the inside face-sheet 42, such as corresponding to an internal stiffening member 19 discussed with reference to FIG. 1 and prior-art radiator panels 10. In some such embodiments, the radiator panel 202 may have a stiffness that is at least approximately equal to a comparably stiff and sized radiator panel that does not include an external structural reinforcement member 200 but that does include an internal structural reinforcement member. In some such embodiments, the mass of the radiator panel 202 may be less than the mass of a comparably stiff and sized radiator panel that does not include an external structural reinforcement member 200 but that does include an internal structural reinforcement member. In some such examples, the mass of the radiator panel 202 may be at least 5%, 10%, 15%, 20%, 25%, or 30% less than the mass of the comparably stiff and sized radiator panel.

In some embodiments, an external structural reinforcement member 200 may be adhered to the outside face-sheet 44, such as with an RTV silicone sealer or any other suitable adhesive. Additionally or alternatively, as optionally and schematically illustrated in FIG. 4, one or more fasteners 208 may be utilized to operatively couple an external structural reinforcement member 200 to the outside face-sheet 44 of a radiator panel 202.

In FIG. 4, an external structural reinforcement member 200 is schematically illustrated in an overlapping relation to heat pipe 40, schematically representing that external structural reinforcement members 200 may or may not be positioned above one or more heat pipes 40 that are positioned between the face-sheets 42, 44 of the radiator panel 202.

Kits for assembling radiator panels 202 are within the scope of the present disclosure and may include a selection of the various components necessary to assembly a radiator panel 202. For example, a kit may include one or more of each of an inside face-sheet 42, an outside face-sheet 44, a heat pipe 40, a core 50, and an external structural reinforcement member 200.

Figure 9:
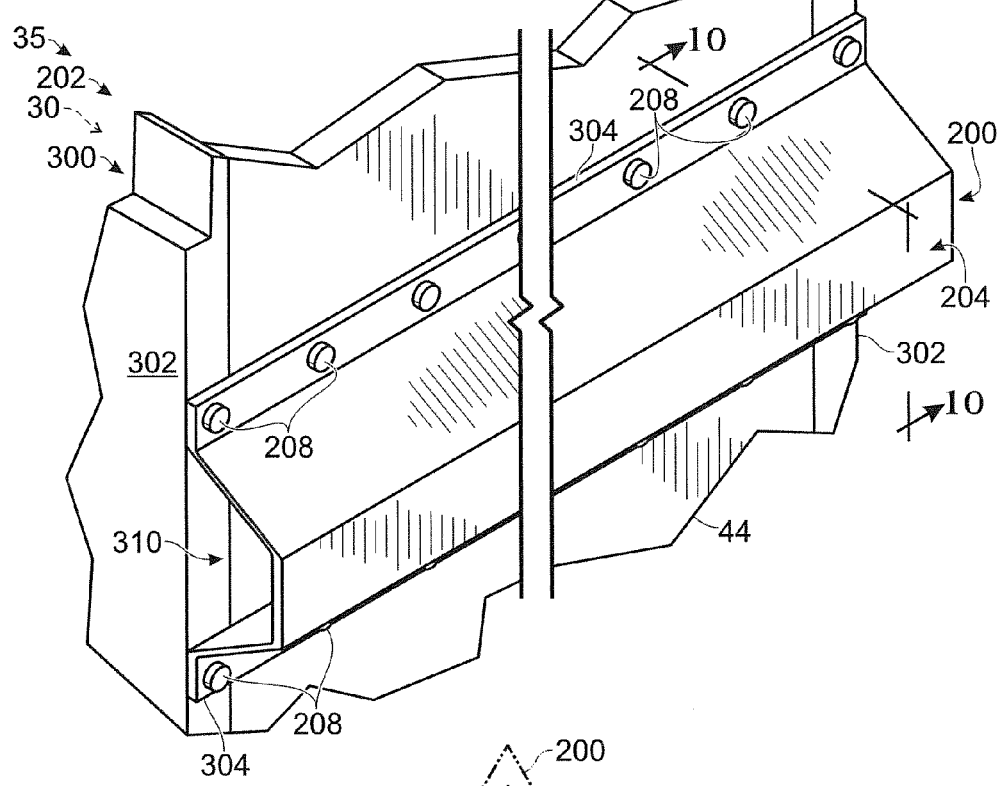
FIG. 9 is an isometric fragmentary view of a portion of an illustrative, non-exclusive example of a radiator panel according to the present disclosure, including an external structural reinforcement member.
Figure 10:
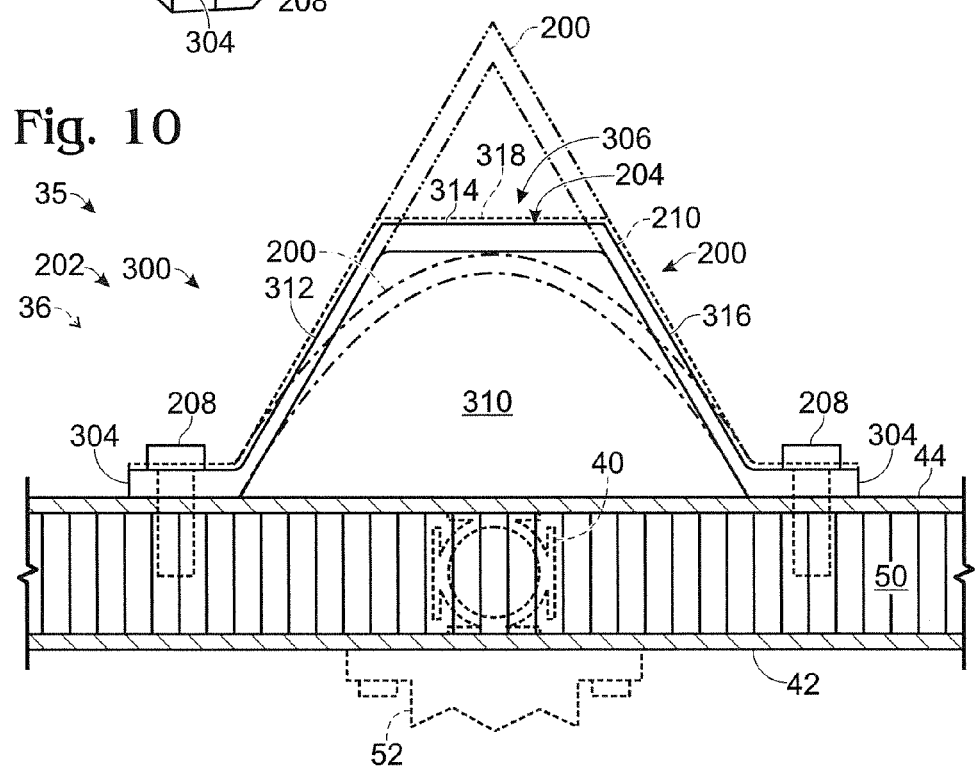
FIG. 10 is a fragmentary cross-sectional view of the radiator panel of FIG. 9, taken along line 10-10, and also schematically illustrating additional non-exclusive examples of external reinforcement members according to the present disclosure.

Turning now to FIGS. 9-10, a portion of an illustrative, non-exclusive example of a radiator panel 202, which optionally also may be a radiator panel 36, is illustrated and is indicated generally at 300. Where appropriate, the reference numerals from the schematic illustrated of FIGS. 3-4 are used to designate corresponding parts of radiator panel 300; however, the example of FIGS. 9-10 is non-exclusive and does not limit the present disclosure to the illustrated embodiment (or variations thereon). That is, neither radiator panels 202, nor portions thereof, are limited to the specific embodiment of radiator panel 300 (or variations thereon) illustrated in FIGS. 9-10, and radiator panels 202 may incorporate any number of the components thereof, including the schematically illustrated examples of FIGS. 3-4, and/or of radiator panel 300, as well as variations thereof, without requiring the inclusion of all such aspects, configurations, characteristics, properties, etc. For the purpose of brevity, each previously discussed component, part, property, etc. or variants thereof may not be discussed again with respect to radiator panel 300 of FIGS. 9-10; however, it is within the scope of the present disclosure that the previously discussed features, variants, etc. may be utilized with radiator panel 300.

Referring first to FIG. 9, radiator panel 300 includes a pair of side frame members 302 that define parallel and lateral sides of the radiator panel 300. Additionally or alternatively, the side frame members 302 may be described as a component of a spacecraft 30, to which a radiator panel 300 is operatively coupled. In the illustrated example of radiator panel 300, the external structural reinforcement member 200 spans the radiator panel 300 between the side frame members 302. That is, the external structural reinforcement member 200 spans the entire width of the radiator panel 300; however, as discussed herein, such a configuration is not required to all embodiments of radiator panels 202.

As seen in FIG. 9, radiator panel 300 is an example of a radiator panel 202 that utilizes fasteners 208 to operatively couple the external structural reinforcement member 200 to the outside face-sheet 44. Moreover, the external structural reinforcement member 200 of radiator panel 300 is operatively coupled to the side frame members 302.

The external structural reinforcement member 200 of radiator panel 300 includes a pair of flanges 304 and a body 306 that interconnects the flanges 304. The flanges 304 are operatively coupled to the outside face-sheet 44 by a plurality of fasteners 208.

The outer surface 204 of the external structural reinforcement member 200 of radiator panel 300 is an example of an outer surface that includes at least two planar surfaces. In the illustrated example, the external structural reinforcement member 200 includes five planar surfaces with the flanges 304 defining two of the planar surfaces and the body 306 defining three of the planar surfaces. As illustrated, the body 306 of the external structural reinforcement member 200 defines a void 310 between the body 306 and the outside face-sheet 44, and in the illustrated example, the void 310 has a perpendicular cross-sectional profile that is trapezoidal. Other shapes also are within the scope of the present disclosure including voids 310 having other quadrilateral shapes, and voids 310 having perpendicular cross-sectional profiles that are triangular, semi-circular, semi-ovular, or variations thereon. Illustrative, non-exclusive examples of such other optionally shaped external structural reinforcement members 200 are illustrated in dash-dot and dash-dot-dot lines in FIG. 10.

In the example illustrated in FIG. 9 and in solid lines in FIG. 10, the planar surfaces of the outer surface 204 of the body 306 are angled greater than 180 degrees relative to each other. The planar surfaces of the outer surface of the flanges 304 are angled between 90 and 180 degrees relative to the adjacent planar surfaces of the body 306. Other angular configurations of the planar surfaces of outer surface 204 are within the scope of the present disclosure, including planar surfaces that are angled between 270 and 360 degrees relative to each other. Moreover, as illustrated in dash-dot lines in FIG. 10, some outer surface 204 of a body 306 may not include any planar surfaces and instead may include a curved, or arcuate, surface.

In the illustrative, non-exclusive example of radiator panel 300, the outer surface 204 includes a first planar surface 312 that is angled approximately 120 degrees relative to the outside face-sheet 44, a second planar surface 314 that is angled approximately 210 degrees relative to the first surface 312 and that is parallel to the outside face-sheet 44, and a third surface 316 that is angled approximately 210 degrees relative to the second surface 314 and approximately 120 degrees relative to the outside face-sheet 44.

As discussed herein, external structural reinforcement members 200 may include mirror structures that are adhered to or otherwise operatively coupled to the body 306 of the external structural reinforcement member 200. In FIG. 10, this optional mirror structure is schematically illustrated in dashed lines at 318.

Illustrative, non-exclusive examples of inventive subject matter according to the present disclosure are described in the following enumerated paragraphs:

A. A radiator panel for a spacecraft, the radiator panel comprising:

two spaced-apart face-sheets including an inside face-sheet and an outside face-sheet;

a heat pipe positioned between the two spaced-apart face-sheets and operatively engaged and in thermal communication with the two spaced-apart face-sheets; and an insert positioned adjacent to the heat pipe (and optionally operatively engaged with the heat pipe), wherein the insert is configured with at least one feature useful in the operative securing of (and optionally to operatively secure) a package to the inside face-sheet opposite the heat pipe and the insert so that heat from the package may operatively conduct from the package through the inside face-sheet to the heat pipe.

A1. The radiator panel of paragraph A, wherein the insert is configured to operatively receive a fastener for securing the package to the inside face-sheet.

A2. The radiator panel of any of paragraphs A-A1, wherein the heat pipe is positioned completely between the two spaced-apart face-sheets.

A3. The radiator panel of any of paragraphs A-A2, wherein the heat pipe does not extend through, or penetrate, the inside face-sheet and/or does not extend through, or penetrate, the outside face-sheet.

A4. The radiator panel of any of paragraphs A-A3, wherein the insert is positioned between, and optionally completely between, the two spaced-apart face-sheets.

A5. The radiator panel of any of paragraphs A-A4, wherein the insert does not extend through, or penetrate, the inside face-sheet and does not extend through, or penetrate, the outside face-sheet.

A6. The radiator panel of any of paragraphs A-A5, wherein the insert is structurally a separate part from the heat pipe.

A7. The radiator panel of any of paragraphs A-A6, further comprising:

the package, wherein the package is secured to the inside face-sheet opposite the heat pipe.

A7.1. The radiator panel of paragraph A7, further comprising:

a gasket positioned between the inside face-sheet and the package.

A7.2. The radiator panel of any of paragraphs A7-A7.1, further comprising:

one or more fasteners that operatively secure the package to the inside face-sheet.

A7.3. The radiator panel of any of paragraphs A7-A7.2, wherein the package includes electronic equipment.

A7.4. The radiator panel of any of paragraphs A7-A7.3, wherein the heat pipe is a first heat pipe, and wherein the package includes a second heat pipe positioned transverse to the first heat pipe.

A8. The radiator panel of any of paragraphs A-A7.4, wherein the heat pipe is an off-the-shelf heat pipe.

A8.1. The radiator panel of paragraph A8, wherein the heat pipe is not modified from its off-the shelf configuration.

A9. The radiator panel of any of paragraphs A-A8.1, wherein the heat pipe is not customized for the radiator panel.

A10. The radiator panel of any of paragraphs A-A9, wherein the heat pipe includes:

a cylindrical core; and an inside extension extending from the cylindrical core, wherein the inside extension defines an inside planar surface that faces away from the cylindrical core, and wherein the inside planar surface operatively engages and is in thermal communication with the inside face-sheet.

A10.1. The radiator panel of paragraph A10, wherein the heat pipe further includes:

an outside extension extending from the cylindrical core, wherein the outside extension defines an outside planar surface that faces away from the cylindrical core and that is generally parallel to the inside planar surface, and wherein the outside planar surface operatively engages and is in thermal communication with the outside face-sheet.

A10.2. The radiator panel of any of paragraphs A10-A10.1, wherein the heat pipe further includes:

a left extension extending from the cylindrical core, wherein the left extension defines a left planar surface that faces away from the cylindrical core, and optionally wherein the left planar surface operatively engages and is in thermal communication with the insert.

A10.2.1. The radiator panel of paragraph A10.2, wherein the insert includes a body and a positioning structure extending from the body, wherein the positioning structure operatively engages the left extension and operatively positions the body relative to and into operative engagement with the left planar surface.

A10.2.2. The radiator panel of any of paragraph A10.2-A10.2.1, wherein the insert includes a body and a retaining structure extending from the body, wherein the retaining structure operatively retains the body to the left extension and the body into operative engagement with the left planar surface.

A10.2.3. The radiator panel of any of paragraphs A10.2-A10.2.2, wherein the heat pipe further includes:

a right extension extending from the cylindrical core, wherein the right extension defines a right planar surface that faces away from the cylindrical core and that is generally parallel to the left planar surface.

A10.2.3.1. The radiator panel of paragraph A10.2.3, wherein the insert is a first insert and the radiator panel further comprises:

a second insert positioned adjacent to the heat pipe generally opposite the first insert, wherein the second insert is configured to operatively secure the package to the inside face-sheet opposite the heat pipe, the first insert, and the second insert; and a second insert positioned adjacent to the heat pipe generally opposite the first insert, wherein the second insert is configured to operatively secure the package to the inside face-sheet opposite the heat pipe, the first insert, and the second insert; and optionally wherein the right planar surface operatively engages and is in thermal communication with the second insert.

A10.2.3.1.1. The radiator panel of paragraph A10.2.3.1, wherein the second insert includes a body and a positioning structure extending from the body of the second insert, wherein the positioning structure of the second insert operatively engages the right extension and operatively positions the body of the second insert relative to and into operative engagement with the right planar surface.

A10.2.3.1.2. The radiator panel of any of paragraph A10.2.3.1-A10.2.3.1.1, wherein the second insert includes a body and a retaining structure extending from the body of the second insert, wherein the retaining structure of the second insert operatively retains the body of the second insert to the right extension and the body of the second insert into operative engagement with the right planar surface.

A11. The radiator panel of any of paragraphs A-A10.2.3.1.2, wherein the heat pipe includes an extruded heat pipe body.

A11.1. The radiator panel of paragraph A11 (when depending from any of paragraphs A10-A10.2.3.1.2), wherein the heat pipe body includes the cylindrical core and one or more of the respective recited extensions of paragraphs A10-A10.2.3.1.2.

A12. The radiator panel of any of paragraphs A-A11.1, further comprising:

honeycomb structure positioned between the two spaced-apart face-sheets.

A13. The radiator panel of any of paragraphs A-A12, further comprising:

corrugated structure positioned between the two spaced-apart face-sheets.

A14. The radiator panel of any of paragraphs A-A13, wherein the outside face-sheet includes a mirrored outside surface for radiating heat away from the spacecraft.

A15. The radiator panel of any of paragraphs A-A14, wherein the outside face-sheet is not penetrated for securement of the package to the inside face-sheet.

A16. The radiator panel of any of paragraphs A-A15, wherein the insert is operatively engaged with the heat pipe.

A16.1. The radiator panel of paragraph A16, wherein the operative engagement between the insert and the heat pipe prevents mechanical creep of the heat pipe during the lifetime of the spacecraft (optionally, including for up to 10 or more years).

A17. The radiator panel of any of paragraphs A-A16.1, wherein the insert includes a plurality of inserts corresponding to a footprint associated with the package.

A18. The radiator panel of any of paragraphs A-A17, wherein the insert is a first insert and the radiator panel further comprises a second insert positioned adjacent to the heat pipe generally opposite the first insert, wherein the second insert is configured with at least one feature useful in the operative securing of the package to the inside face-sheet opposite the heat pipe from the second insert.

A19. The radiator panel of any of paragraphs A-A18, wherein the insert further includes a cylindrical core and an extension extending from the cylindrical core, wherein the extension defines a substantially planar extension surface that faces away from the cylindrical core, and wherein the insert includes a substantially planar insert surface operatively engaged and in thermal communication with the substantially planar extension surface.

A20. A spacecraft including the radiator panel of any of paragraphs A-A19.

B. An insert for securing a package to a radiator panel of a spacecraft, wherein the radiator panel includes two spaced-apart face-sheets including an inside face-sheet and an outside face-sheet, and a heat pipe positioned between the two spaced-apart face-sheets, the insert comprising:

a body configured to be positioned between the two spaced-apart face-sheets and adjacent to the heat pipe (and optionally operatively engaged with the heat pipe) and to operatively secure the package to the inside face-sheet opposite the heat pipe and the insert so that heat from the package may operatively conduct from the package through the inside face-sheet to the heat pipe.

B1. The insert of paragraph B, wherein the insert is configured to mate with a heat pipe that includes a cylindrical core and an extension extending from the cylindrical core, wherein the extension defines a planar surface that faces away from the cylindrical core, and wherein the insert is configured to mate with the extension.

B1.1. The insert of paragraph B1, further comprising:

a positioning structure extending from the body, wherein the positioning structure is configured to operatively engage the extension for operative positioning of the body relative to and into operative engagement with the planar surface.

B1.2. The insert of any of paragraphs B1-B1.1, further comprising:

a retaining structure extending from the body, wherein the retaining structure is configured to operatively retain the body to the extension and the body into operative engagement with the planar surface.

B2. The insert of any of paragraphs B-B1.2, wherein the body is configured to operatively receive a fastener for securing the package to the inside face-sheet.

B3. A plurality of inserts according to any of paragraphs B-B2.

B3.1. The plurality of inserts of paragraph B3, comprising:
a first insert having a first width; and
a second insert having a second width that is greater than the first width.

C. A kit for assembling a radiator panel for a spacecraft, the kit comprising:
an inside face-sheet;
an outside face-sheet;
one or more heat pipes for being positioned between the inside face-sheet and the outside face-sheet; and a plurality of inserts, wherein each insert is configured to be positioned adjacent to a heat pipe (and optionally operatively engaged with the heat pipe) between the inside face-sheet and the outside face-sheet, and wherein each insert is configured to operatively secure a package to the inside face-sheet opposite the heat pipe.

C1. The kit of paragraph C, wherein the plurality of inserts includes a first subset of inserts having a first width and a second subset of inserts having a second width that is greater than the first width.

C2. The kit of any of paragraphs C-C1, wherein the inside face-sheet, the outside face-sheet, the one or more heat pipes, and the plurality of inserts are configured to be assembled selectively into an assembled configuration of the radiator panel, wherein in the assembled configuration, the heat pipe does not extend through an opening in the inside face-sheet and the plurality of inserts do not extend through bores in the inside face-sheet.

C3. The kit of any of paragraphs C-C2, further comprising the subject matter of any of paragraphs A-B3.1.

D. A method of assembling a radiator panel for a spacecraft, the method comprising:
positioning an insert adjacent to a heat pipe (and optionally in operative engagement with the heat pipe);
positioning an inside face-sheet and an outside face-sheet on opposed sides of the insert and the heat pipe;
positioning a package operatively on the inside face-sheet opposite the heat pipe so that heat from the package may operatively conduct from the package through the inside face-sheet to the heat pipe; and
securing the package to the inside face-sheet and the insert.

D1. The method of paragraph D, wherein the insert, the heat pipe, the inside face-sheet, the outside face-sheet, and the package include the corresponding subject matter of any of paragraphs A-B3.1.

D2. The method of any of paragraphs D-D1, wherein the method does not include alteration of the heat pipe.

D3. The method of any of paragraphs D-D2, wherein the method does not include cutting the inside face-sheet for passage of a flange associated with a heat pipe.

D4. The method of any of paragraphs D-D3, wherein the method does not include extending a portion of the heat pipe through an opening in the inside face-sheet.

D5. The method of any of paragraphs D-D4, wherein the securing does not include penetrating the outside face-sheet.

D6. The method of any of paragraphs D-D5, wherein the insert is a first insert, the method further comprising:
positioning a second insert adjacent to the heat pipe (and optionally in operative engagement with the heat pipe) generally opposite the first insert;
wherein the securing includes securing the package to the second insert.

D7. The method of any of paragraphs D-D6, wherein the method does not include modifying a corrugated or honeycomb core associated with the radiator panel.

D8. The method of any of paragraphs D-D7, wherein the method results in a radiator panel according to any of paragraphs A-A19.

E. A radiator panel for a spacecraft, the radiator panel comprising:
two spaced-apart face-sheets including an inside face-sheet and an outside face-sheet;
a core positioned between the two spaced-apart face-sheets; and
at least one external structural reinforcement member extending across an external side of the outside face-sheet.

E1. The radiator panel of paragraph E, further comprising:
at least one heat pipe positioned between the two spaced-apart face-sheets and operatively engaged and in thermal communication with the two spaced-apart face-sheets.

E1.1 The radiator panel of paragraph E1, wherein the heat pipe is sized to have a predetermined heat transfer rate associated with the radiator panel, wherein the predetermined heat transfer rate is no more than 100%, 110%, 120%, 130%, 140%, 150%, 160%, 170%, 180%, 190%, or 200% of a requisite heat transfer rate for the radiator panel.

E2. The radiator panel of any of paragraphs E-E1.1, wherein the core includes a honeycomb core.

E3. The radiator panel of any of paragraphs E-E2, wherein the radiator panel has a width and a height, and wherein the at least one external structural reinforcement member substantially spans the width of the radiator panel.

E4. The radiator panel of any of paragraphs E-E3, wherein the at least one structural reinforcement member includes a plurality of spaced-apart structural reinforcement members.

E5. The radiator panel of any of paragraphs E-E4, wherein the at least one external structural reinforcement member defines an outer surface that generally faces away from the outside face-sheet.

E5.1. The radiator panel of paragraph E5, wherein the outer surface is shaped to restrict reflection of light incident on the outer surface onto the outside face-sheet.

E5.1.1. The radiator panel of paragraph E5.1, wherein the at least one external structural reinforcement member includes a plurality of spaced-apart external structural reinforcement members, and wherein a spacing between adjacent external structural reinforcement members restricts reflection of light incident on the outer surface of the external structural reinforcement members onto the outside face-sheet.

E5.2. The radiator panel of any of paragraphs E5-E5.1.1, wherein the outer surface is configured to reflect at least 30%, at least 40%, at least 50%, at least 60%, at least 70%, at least 80%, at least 90%, 30%-90%, 30%-70%, 30%-50%, 50%-90%, 50%-70%, or 70%-90% of all incident light on the outer surface away from the outside face-sheet.

E5.3. The radiator panel of any of paragraphs E5-E5.2, wherein the outer surface includes at least two planar surfaces.

E5.4. The radiator panel of any of paragraphs E5-E5.3, wherein the outer surface includes at least two planar surfaces that are angled greater than 180 degrees relative to each other.

E5.5. The radiator panel of any of paragraphs E5-E5.4, wherein the outer surface includes at least two planar surfaces that are angled between 90 and 180 degrees relative to each other.

E5.6. The radiator panel of any of paragraphs E5-E5.5, wherein the outer surface includes at least two planar surfaces that are angled between 270 and 360 degrees relative to each other.

E5.7. The radiator panel of any of paragraphs E5-E5.6, wherein the outer surface includes a first surface that is angled (or approximately angled) 120 degrees relative to the outside face-sheet, a second surface that is angled (or approximately angled) 210 degrees relative to the first surface and that is parallel (or approximately parallel) to the outside face-sheet, and a third surface that is angled (or approximately angled) 210 degrees relative to the second surface and 120 degrees relative to the outside face-sheet.

E5.8. The radiator panel of any of paragraphs E5-E5.7, wherein the outer surface includes at least one arcuate (or curved) surface.

E5.9. The radiator panel of any of paragraphs E5-E5.8, wherein the outer surface includes a mirrored finish.

E6. The radiator panel of any of paragraphs E-E5.9, wherein the at least one external structural reinforcement member defines a void between the at least one external structural reinforcement member and the outside face-sheet.

E6.1. The radiator panel of paragraph E6, wherein a perpendicular cross-sectional profile of the void is a trapezoid.

E6.2. The radiator panel of paragraph E6, wherein a perpendicular cross-sectional profile of the void is a quadrilateral.

E6.3. The radiator panel of paragraph E6, wherein a perpendicular cross-sectional profile of the void is a semi-circle or semi-oval or substantially similar to a semi-circle or semi-oval.

E6.4. The radiator panel of paragraph E6, wherein a perpendicular cross-sectional profile of the void is a triangle.

E7. The radiator panel of any of paragraphs E-E6.4, wherein the at least one external structural reinforcement member includes a pair of flanges coupled to the outside face-sheet and a body that interconnects the flanges.

E7.1. The radiator panel of paragraph E7, wherein the at least one external structural reinforcement member defines an outer surface that generally faces away from the outside face-sheet, and wherein the pair of flanges defines a portion of the outer surface.

E7.2. The radiator panel of any of paragraphs E7-E7.1, wherein the pair of flanges is adhered to the outside-face sheet.

E7.3. The radiator panel of any of paragraphs E7-E7.2, further comprising:

a plurality of fasteners extending through the pair of flanges, through the outside face-sheet, and into the core.

E8. The radiator panel of any of paragraphs E-E7.3, wherein the radiator panel has a natural frequency of approximately 20-50, 30-50, 40-50, 20-40, 30-40, 20-30, 20, 25, 30, 35, 40, 45, or 50 hertz.

E9. The radiator panel of any of paragraphs E-E8, wherein the two spaced-apart face-sheets define a panel depth (or thickness) between the two spaced-apart face-sheets, wherein the radiator panel defines a panel stiffness that is at least approximately equal to a stiffness of a comparably stiff and sized radiator panel that does not include an external structural reinforcement member, and wherein the panel depth is less than a depth (or thickness) of the comparably stiff and sized radiator panel.

E9.1. The radiator panel of paragraph E9, wherein the panel depth is less than 90%, 80%, 70%, 60%, 50%, 40%, or 30% of the depth of the comparably stiff and sized radiator panel.

E10. The radiator panel of any of paragraphs E-E9.1, wherein the radiator panel has a panel mass, wherein the radiator panel defines a panel stiffness that is at least approximately equal to a stiffness of a comparably stiff and sized radiator panel that does not include an external structural reinforcement member, and wherein the panel mass is less than a mass of the comparably stiff and sized radiator panel.

E10.1. The radiator panel of paragraph E10, wherein the panel mass is at least 5%, 10%, 15%, 20%, 25%, or 30% less than the mass of the comparably stiff and sized radiator panel.

E11. The radiator panel of any of paragraphs E-E10.1, wherein the radiator panel is free of internal structural reinforcement members coupled to the inside face-sheet, and wherein the radiator panel defines a panel stiffness.

E11.1. The radiator panel of paragraph E11, wherein the panel stiffness is at least approximately equal to a stiffness of a comparably stiff and sized radiator panel that does not include an external structural reinforcement member and that does include at least one internal structural reinforcement member.

E11.2. The radiator panel of any of paragraphs E11-E11.1, wherein the radiator panel has a panel mass, wherein the panel stiffness is at least approximately equal to a stiffness of a comparably stiff and sized radiator panel that does not include an external structural reinforcement member and that does include at least one internal structural reinforcement member, and wherein the panel mass is at least 5%, 10%, 15%, 20%, 25%, or 30% less than the mass of the comparably stiff and sized radiator panel.

E12. The radiator panel of any of paragraphs E-E11.2, further comprising:

a pair of side frame members defining parallel and lateral edges of the radiator panel, wherein the at least one external structural reinforcement member spans the radiator panel between the pair of side frame members.

E12.1. The radiator panel of paragraph E12, wherein the at least one external radiator panel is operatively coupled to the pair of side frame members.

E13. The radiator panel of any of paragraphs E-E12.1, wherein the at least one external structural reinforcement member includes a plurality of spaced-apart and parallel external structural reinforcement members.

E14. The radiator panel of any of paragraphs E-E13, further comprising the subject matter of any of paragraphs A-A20.

F. An external structural reinforcement member for stiffening a radiator panel of a spacecraft, the external structural reinforcement member comprising:

a body configured to be operatively coupled to and extend across an outside face-sheet of the radiator panel.

F1. The external structural reinforcement member of paragraph F, further comprising the subject matter associated with the external structural reinforcement member of any of paragraphs E-E14.

G. A kit for assembling a radiator panel for a spacecraft, the kit comprising:

an inside face-sheet;

an outside face-sheet;

a core for being positioned between the inside face-sheet and the outside face-sheet;

at least one heat pipe for being positioned between the inside face-sheet and the outside face-sheet; and at least one external structural reinforcement member configured to be operatively coupled to the outside face-sheet for structurally stiffening the radiator panel.

G1. The kit of paragraph G, further comprising the subject matter of any of paragraphs A-C3 and E-E14.

H. A method of assembling a radiator panel for a spacecraft, the method comprising:

operatively coupling an outside face-sheet and an inside face-sheet to a core;

positioning at least one heat pipe between the outside face-sheet and the inside face-sheet; and operatively coupling an external structural reinforcement member to the outside face-sheet.

H1. The method of paragraph H, further comprising the method of any of paragraphs D-D8.

H2. The method of any of paragraphs H-H1, wherein the radiator panel includes the corresponding subject matter of any of paragraphs E-E14.

H3. The method of any of paragraphs H-H2, wherein the method does not include operatively coupling an internal structural reinforcement member to the inside face-sheet.

H4. The method of any of paragraphs H-H3, wherein the method results in a radiator panel according to any of paragraphs E-E14.

The various disclosed elements of systems, apparatuses, and kits disclosed herein and the various disclosed steps of methods disclosed herein are not required to all systems, apparatuses, kits, and methods according to the present disclosure. Moreover, one or more of the various elements and steps disclosed herein may define independent inventive subject matter that is separate and apart from the whole of a disclosed system, apparatus, kit, or method. Accordingly, such inventive subject matter is not required to be associated with the specific systems, apparatuses, kits, and methods that are expressly disclosed herein, and such inventive subject matter may find utility in systems, apparatuses, kits, and/or methods that are not expressly disclosed herein.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

The disclosure set forth above encompasses multiple distinct inventions with independent utility. While each of these inventions has been disclosed in its preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods, and/or steps disclosed herein. Similarly, where any disclosure above or claim below recites "a" or "a first" element, step of a method, or the equivalent thereof, such disclosure or claim should be understood to include incorporation of one or more such elements or steps, neither requiring nor excluding two or more such elements or steps.

It is believed that the following claims particularly point out certain combinations and subcombinations that are directed to one of the disclosed inventions and are novel and non-obvious. Inventions embodied in other combinations and subcombinations of features, functions, elements, properties, methods, and/or steps may be claimed through amendment of the present claims or presentation of new claims in this or a related application. Such amended or new claims, whether they are directed to a different invention or directed to the same invention, whether different, broader, narrower, or equal in scope to the original claims, also are regarded as within the subject matter of the inventions of the present disclosure.

The invention claimed is:

1. A radiator panel for a spacecraft, the radiator panel comprising:
   two spaced-apart face-sheets including an inside face-sheet and an outside face-sheet;
   at least one heat pipe positioned between the two spaced-apart face-sheets and operatively engaged and in thermal communication with the two spaced-apart face-sheets, wherein the at least one heat pipe includes a side extension with a substantially planar extension surface that is perpendicular to the two spaced-apart face-sheets;
   a core positioned between the two spaced-apart face-sheets;
   an insert positioned adjacent to the at least one heat pipe, wherein the insert includes a substantially planar insert surface that is perpendicular to the two spaced-apart face-sheets and that is operatively engaged with the substantially planar extension surface of the at least one heat pipe, wherein the insert is configured with at least one feature useful in the operative securing of a package to the inside face-sheet opposite the at least one heat pipe and the insert so that heat from the package may operatively conduct from the package through the inside face-sheet to the at least one heat pipe, wherein the insert extends from the inside face-sheet to the outside face-sheet, wherein the insert engages the inside face-sheet and the outside face-sheet, wherein the insert includes a positioning structure extending adjacent to the substantially planar insert surface, wherein the positioning structure includes a lip that wraps around a first edge of the side extension of the at least one heat pipe, and wherein the insert includes a retaining structure extending adjacent to the substantially planar insert surface opposite the positioning structure relative to the planar extension surface and that includes a clip that engages a second edge of the side extension of the at least one heat pipe; and
   at least one external structural reinforcement member extending across an external side of the outside face-sheet and substantially spanning an entire width of the radiator panel, wherein the at least one external structural reinforcement member defines a void between the at least one external structural reinforcement member and the outside face-sheet, wherein each of the at least one external structural reinforcement member has a longitudinal axis;
   wherein the radiator panel is free of heat pipes that are directly opposite, relative to the outside face-sheet, and longitudinally aligned with the longitudinal axis of at least one of the at least one external structural reinforcement member.

2. The radiator panel of claim 1, wherein the at least one structural reinforcement member includes a plurality of spaced-apart structural reinforcement members.

3. The radiator panel of claim 1, wherein the at least one external structural reinforcement member includes an outer reflective surface that generally faces away from the outside face-sheet, wherein the outer reflective surface has means for reflecting 30%-90% of all incident light on the outer reflective surface away from the outside face-sheet.

4. The radiator panel of claim 3, wherein the outer surface includes at least two planar surfaces.

5. The radiator panel of claim 3, wherein the outer surface includes at least two planar surfaces that are angled greater than 180 degrees relative to each other.

6. The radiator panel of claim 3, wherein the outer surface includes a first surface that is angled 120 degrees relative to the outside face-sheet, a second surface that is angled 210 degrees relative to the first surface and that is parallel to the outside face-sheet, and a third surface that is angled 210 degrees relative to the second surface and 120 degrees relative to the outside face-sheet.

7. The radiator panel of claim 3, wherein the outer surface includes at least one curved surface.

8. The radiator panel of claim 1, wherein a perpendicular cross-sectional profile of the void is a trapezoid.

9. The radiator panel of claim 1, wherein the radiator panel has a natural frequency in the range of 30-40 hertz.

10. The radiator panel of claim 1, wherein the radiator panel is free of internal structural reinforcement members coupled to the inside face-sheet.

11. The radiator panel of claim 1, wherein the at least one heat pipe is sized to have a predetermined heat transfer rate associated with the radiator panel, wherein the predetermined heat transfer rate is no more than 120% of a requisite heat transfer rate for the radiator panel.

12. The radiator panel of claim 1, wherein the void has a thickness that is greater than a thickness of the core.

13. A radiator panel for a spacecraft, the radiator panel comprising:

two spaced-apart face-sheets including an inside face-sheet and an outside face-sheet;

at least one heat pipe positioned between the two spaced-apart face-sheets and operatively engaged and in thermal communication with the two spaced-apart face-sheets, wherein the at least one heat pipe includes a side extension with a substantially planar extension surface that is perpendicular to the two spaced-apart face-sheets;

a core positioned between the two spaced-apart face-sheets;

an insert positioned adjacent to the at least one heat pipe, wherein the insert includes a substantially planar insert surface that is perpendicular to the two spaced-apart face-sheets and that is operatively engaged with the substantially planar extension surface of the at least one heat pipe, wherein the insert is configured with at least one feature useful in the operative securing of a package to the inside face-sheet opposite the at least one heat pipe and the insert so that heat from the package may operatively conduct from the package through the inside face-sheet to the at least one heat pipe, wherein the insert extends from the inside face-sheet to the outside face-sheet, wherein the insert engages the inside face-sheet and the outside face-sheet, wherein the insert includes a positioning structure extending adjacent to the substantially planar insert surface, wherein the positioning structure includes a lip that wraps around a first edge of the side extension of the at least one heat pipe, and wherein the insert includes a retaining structure extending adjacent to the substantially planar insert surface opposite the positioning structure relative to the planar extension surface and that includes a clip that engages a second edge of the side extension of the at least one heat pipe; and a plurality of spaced-apart and parallel external structural reinforcement members extending across an external side of the outside face-sheet, wherein each of the external structural reinforcement members include an outer reflective surface that generally faces away from the outside face-sheet and that includes at least two planar surfaces that are angled greater than 180 degrees relative to each other, wherein the spacing of the external structural reinforcement members and the configuration of the outer reflective surfaces of the external structural reinforcement members define means for reflecting 30%-90% of all incident light on the outer reflective surfaces away from the outside face-sheet, wherein at least one of the plurality of spaced-apart and parallel external structural reinforcement members substantially spans an entire width of the radiator panel, wherein each of the plurality of spaced-apart and parallel external structural reinforcement members has a longitudinal axis;

wherein the radiator panel is free of heat pipes that are directly opposite, relative to the outside face-sheet, and longitudinally aligned with the longitudinal axis of at least one of the plurality of spaced-apart and parallel external structural reinforcement members.

\* \* \* \* \*